United States Patent [19]

Bedard et al.

[11] Patent Number: 4,683,570
[45] Date of Patent: Jul. 28, 1987

[54] SELF-CHECKING DIGITAL FAULT DETECTOR FOR MODULAR REDUNDANT REAL TIME CLOCK

[75] Inventors: James F. Bedard, Schenectady, N.Y.; Vilay C. Jaswa, San Jose, Calif.

[73] Assignee: General Electric Company, Schenectady, N.Y.

[21] Appl. No.: 771,852

[22] Filed: Sep. 3, 1985

[51] Int. Cl.⁴ .............................................. G06F 11/18
[52] U.S. Cl. ........................................ 371/36; 371/61
[58] Field of Search ............................. 371/36, 61, 12; 364/200, 900

[56] References Cited

U.S. PATENT DOCUMENTS

| | | | |
|---|---|---|---|
| 3,667,057 | 5/1972 | Pfersch, Jr. et al. | 371/36 X |
| 3,670,148 | 6/1972 | Moses | 371/36 X |
| 3,686,493 | 8/1972 | Schmid | 371/68 X |
| 3,803,568 | 4/1974 | Higashide | 340/213 R |
| 3,921,149 | 11/1975 | Kreis et al. | 340/172.5 |
| 4,015,246 | 3/1977 | Hopkins, Jr. et al. | 340/172.5 |
| 4,072,852 | 2/1978 | Hogan et al. | 235/303.1 |
| 4,130,241 | 12/1978 | Meredith et al. | 235/307 |
| 4,143,353 | 3/1979 | Schaible | 371/36 X |
| 4,375,683 | 3/1983 | Wensley | 371/36 |
| 4,586,179 | 4/1986 | Sirazi et al. | 371/12 |
| 4,600,987 | 7/1986 | Manbudiri | 364/200 |

OTHER PUBLICATIONS

Ingle et al., A Reliability Model for Various Switch Designs in Hybrid Redundancy, IEEE Trans. on Computers, vol. C-25, No. 2, Feb. 1976, pp. 115-133.
Smith, T. Basil; "Fault-Tolerant Clocking System", Digest of Papers, 11th Int'l Symposium, Charles Stark Draper Laboratory, Inc., Cambridge, Massachusetts, Jun. 1981, pp. 262-264.
Davies, Daniel and Wakerly, John F.; "Synchronization and Matching in Redundant Systems", IEEE Transactions on Computers, vol. C-27, No. 6, Jun. 1978, pp. 531-539.

Primary Examiner—Charles E. Atkinson
Attorney, Agent, or Firm—Donald R. Campbell; James C. Davis, Jr.; Paul R. Webb, II

[57] ABSTRACT

A self-checking detector for detecting faults in a multiple redundant clock system includes a majority voter circuit for receiving the clock signals from the redundant clock circuits and for providing a voted output, a comparison circuit for comparing each of the clock signals with the voted output, and failure signal producing circuits responsive to the outputs from the comparison circuit for producing a first failure signal upon a clock failure being detected and for producing a second failure signal upon a failure of the majority voter being detected. The detector further includes power-up reset circuitry for inhibiting its operation during a power-up interval, and a reset circuit enabling either automatic or manual reset of the detector for verification of the detected fault.

7 Claims, 3 Drawing Figures

SELF-CHECKING DIGITAL FAULT DETECTOR FOR MODULAR REDUNDANT REAL TIME CLOCK

BACKGROUND OF THE INVENTION

This invention relates to a detector for detecting, in real time, the failure of a real time digital clock in a modular redundant clock system, and which has the ability to self-check itself to detect an internal fault.

In the most common form of modular redundancy, three identical processors or machines are employed in a triple modular redundancy (TMR) configuration in which the processors work synchronously on the same task and their outputs are voted by hardware or software to provide a majority answer. For reliability and efficiency, real time clocking of the processors is preferably provided by employing a fault-tolerant hardware clock system comprising three redundant synchronized clock circuits and a majority voter to permit continued correct system operation with the loss of less than a majority of the clock circuits. This is possible because of the masking action of the majority voter. However, in a TMR system, if one clock circuit fails the system cannot tolerate a second failure. Accordingly, it is desirable to employ a detector for indicating that a failure has occurred so that proper remedial action may be taken. Moreover, the detector should also be capable of verifying that the failure was not within itself.

Although self-checking detectors are known, these detectors typically use special codes or special bit patterns for self-checking. Error checking of majority voters in TMR systems has been accomplished by exercising the voter with specific output levels from the three redundant channels corresponding to all possible combinations of two one's and a zero, and reading the voter output for verification of correct operation. This type of checking substantially increases the software overhead of the system, and is also not in real time in the sense that the checking may only be performed at specified intervals. This type of checking is not feasible for the modular redundant clock system which must run uninterrupted.

It is desirable to provide a self-checking detector for a modular redundant clock system which avoids these and other disadvantages of known detectors, and it is to this end that the present invention is directed.

SUMMARY OF THE INVENTION

The invention affords a detector which is capable of detecting, in real time, a failure in a digital clock circuit in a modular redundant clock system, has the ability to self-check itself for an internal failure, and which provides an output indication of the nature of the failure which was detected so that necessary corrective action may be undertaken. The detector, which may be readily implemented using conventional digital logic elements, continuously monitors the clock signals provided by the clock circuits, and continually monitors itself, to detect a failure. The detector does not require the use of special codes or bit patterns, imposes no software overhead on the system, and does not require interruption of the clock system.

Briefly stated, a self-checking detector in accordance with the invention may comprise a majority voter circuit for receiving the clock signals from a plurality of clock circuits in a modular redundant clock system and for producing a voted majority output signal. Comparison means compares each of the clock signals with the voted majority output signal and provides a plurality of comparison signals, one for each clock signal, which are representative of the results of the comparisons. Means responsive to the plurality of comparison signals provides a first failure signal to indicate a failure of a clock circuit and provides a second failure signal to indicate a failure of the majority voter circuit.

In accordance with more specific aspects, the failure signals may be employed for providing visual indications of the nature of the failure, and may be used as interrupts in an associated processor system which resets the detector and awaits further failure signals to ensure that the detected failure was not a transient occurrence. The detector may further include means for inhibiting its operation for a predetermined period of time upon power-up of the system in order to give the system time to stabilize.

DESCRIPTION OF THE PREFERRED EMBODIMENT

The invention is particularly well adapted for use with a multiple redundant real time clock system for detecting failures in the real time clocks of such system, and will be described in that context. However, as will become apparent, the detector may also be used for detecting failures of other types in multiple redundant systems.

Figure 1:
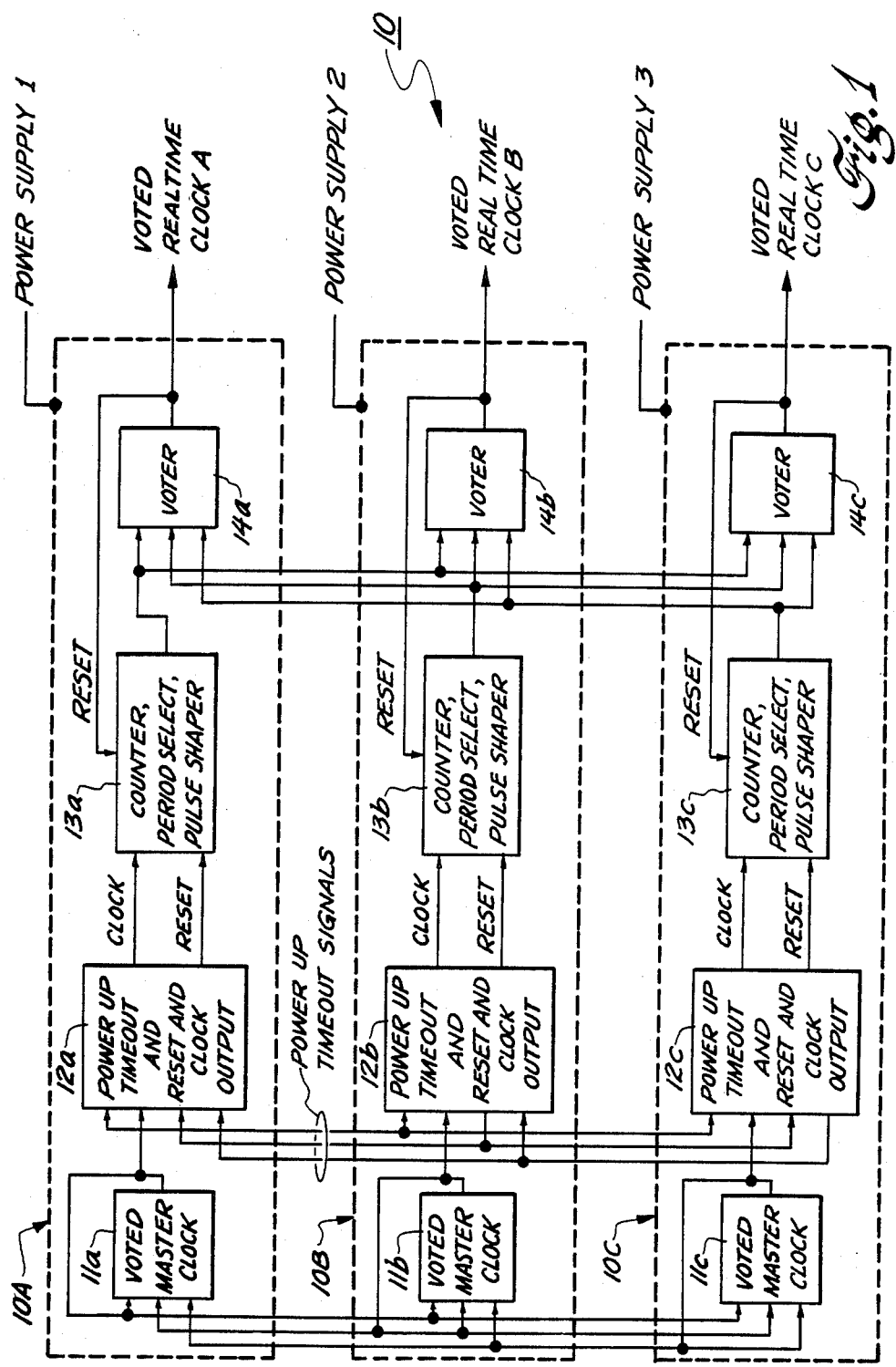
FIG. 1 is a block diagram of a modular redundant real time clock of the type with which the invention may be employed.

FIG. 1 illustrates a fault-tolerant real time clock system 10 of the type with which the invention may be employed. For purposes of describing the invention, clock system 10 may be assumed to have a triple modular redundant (TMR) configuration and comprise three identical clock circuits 10A, 10B, and 10C. The clock system is intended for use with a TMR processor system (not shown in FIG. 1) to provide voted real time clocks A, B, and C to the processor system, as well as to provide processor clocks and reset signals (not indicated in FIG. 1). All critical inputs and outputs of the clock system are voted to assure continued operation if one circuit, i.e., channel, fails. Each circuit is separately powered by power supplies common to a central processing unit (not illustrated) associated with that circuit. Accordingly, upon a power supply failure occurring, only one channel, i.e., clock circuit, will fail, allowing the other two to continue proper operation.

The details of the construction and operation of the clock system of FIG. 1 are not critical to the invention and will be described only insofar as is necessary to afford an understanding of the invention. The clock system may be similar to that described in applicant's co-pending application Ser. No. 481,958 filed Apr. 14, 1983, now abandoned, and continuation application Ser. No. 780,539, filed Sept. 26, 1985, now U.S. Pat. No. 4,644,498, the disclosure of which is incorporated by reference herein, and reference may be had to that patent for a more complete description of the clock system.

An overview of the operation of clock circuit 10A will first be presented. The operation of the other clock circuits is similar, and corresponding components in each clock circuit are identified by the same reference numerals with appropriate suffixes "b" and "c" corresponding to the clock circuit in which they are located. As shown in FIG. 1, a voted master clock 11a, for example, a 5 MHz phase locked crystal clock, is applied to a power-up timeout and reset and clock output circuit 12a that inhibits output to a counter period select, and pulse shaper circuit 13a until all three power supplies have been turned on and have stabilized. A reset signal generated by circuit 12a during the initial timeout period plus a predetermined period of time following the initial period is applied to circuit 13a inhibit its operation. This is done to allow the master clock to be used as a processor clock, if desired, and to ensure compatibility with the proper power-up routine of the processors employed in the processor system. The reset and clock signals from circuit 12a are applied to a counter (not specifically illustrated) in circuit 13a, which begins countdown and produces sets of real time clock pulses with a variable time period. The separate clock pulses are applied to a data selector or period select circuit (also not illustrated) in circuit 13a, which selects an appropriate clock signal, and applies the selected clock signal to a pulse shaper in circuit 13a to produce a clock pulse of a predetermined pulse width at the selected frequency. The real time clock output from circuit 13a is applied to a majority voter circuit 14a along with the real time clocks from clock circuits 10B and 10C. The output from the majority voter becomes the voted real time clock A. Similarly, clock circuits 10B and 10C provide voted real time clocks B and C, respectively. All three outputs are continuously produced, despite the failure of one complete clock circuit. The voted real time clocks, along with the processor clocks and reset signals may be applied to an associated processor system 18, as shown in FIG. 2.

Figure 2:
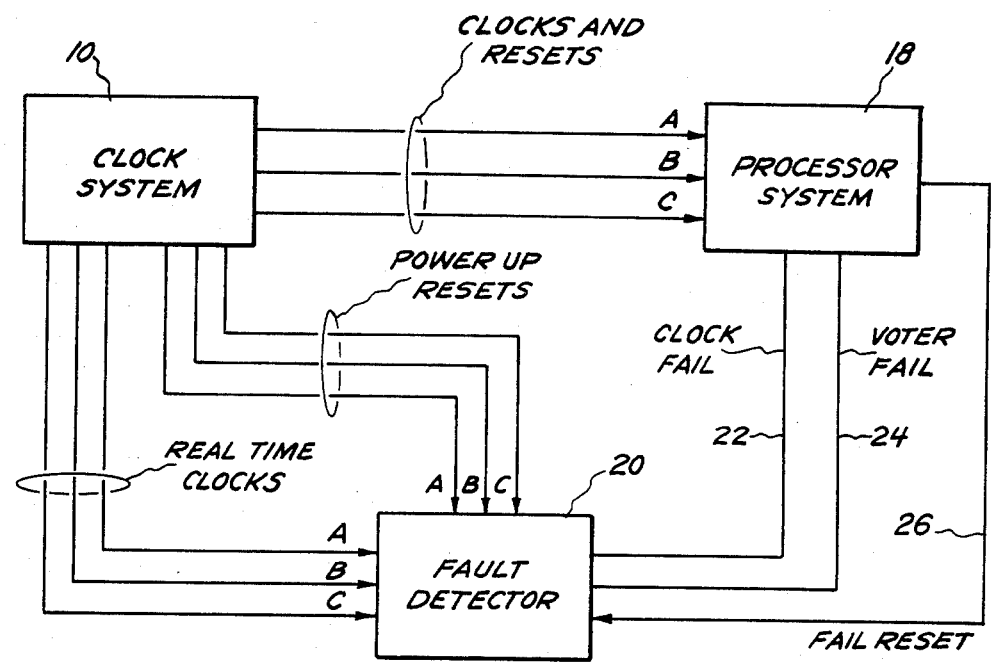
FIG. 2 is a block diagram illustrating a fault detector in accordance with the invention employed with a modular redundant clock and processor system.

FIG. 2 illustrates the manner in which a fault detector 20 in accordance with the invention may be employed with clock system 10 and processor system 18. As shown in the figure, the fault detector receives the real time clocks A, B, and C produced by the clock system. These real time clocks are the outputs of circuits 13a, 13b, and 13c, respectively, of the three clock circuits of FIG. 1. The fault detector also receives the power-up reset signals A, B, and C, produced by circuits 12a, 12b, and 12c, respectively, of the three clock circuits. As will be described in more detail shortly, the fault detector continuously monitors in real time the clock signals from the clock system and provides a CLK FAIL signal on an output line 22 upon detecting a failure of a clock circuit. In addition, the fault detector continuously monitors itself and outputs another signal (VOTER FAIL) on line 24 upon a failure occurring in a majority voter circuit within the fault detector.

As shown in FIG. 2, these failure signals may be supplied to processor system 18 to notify the processor system of a failure. The processor system may supply a FAIL RESET signal via a line 26 back to the fault detector to reset the fault detector. If the detected fault was a "hard" or permanent fault, the fault detector will again output a failure signal after being reset. If, however, the detected fault was merely a transient occurrence, the failure signal will not be repeated. In this way, the processor system can readily check to determine whether the detected faults are permanent or transient in nature.

Figure 3:
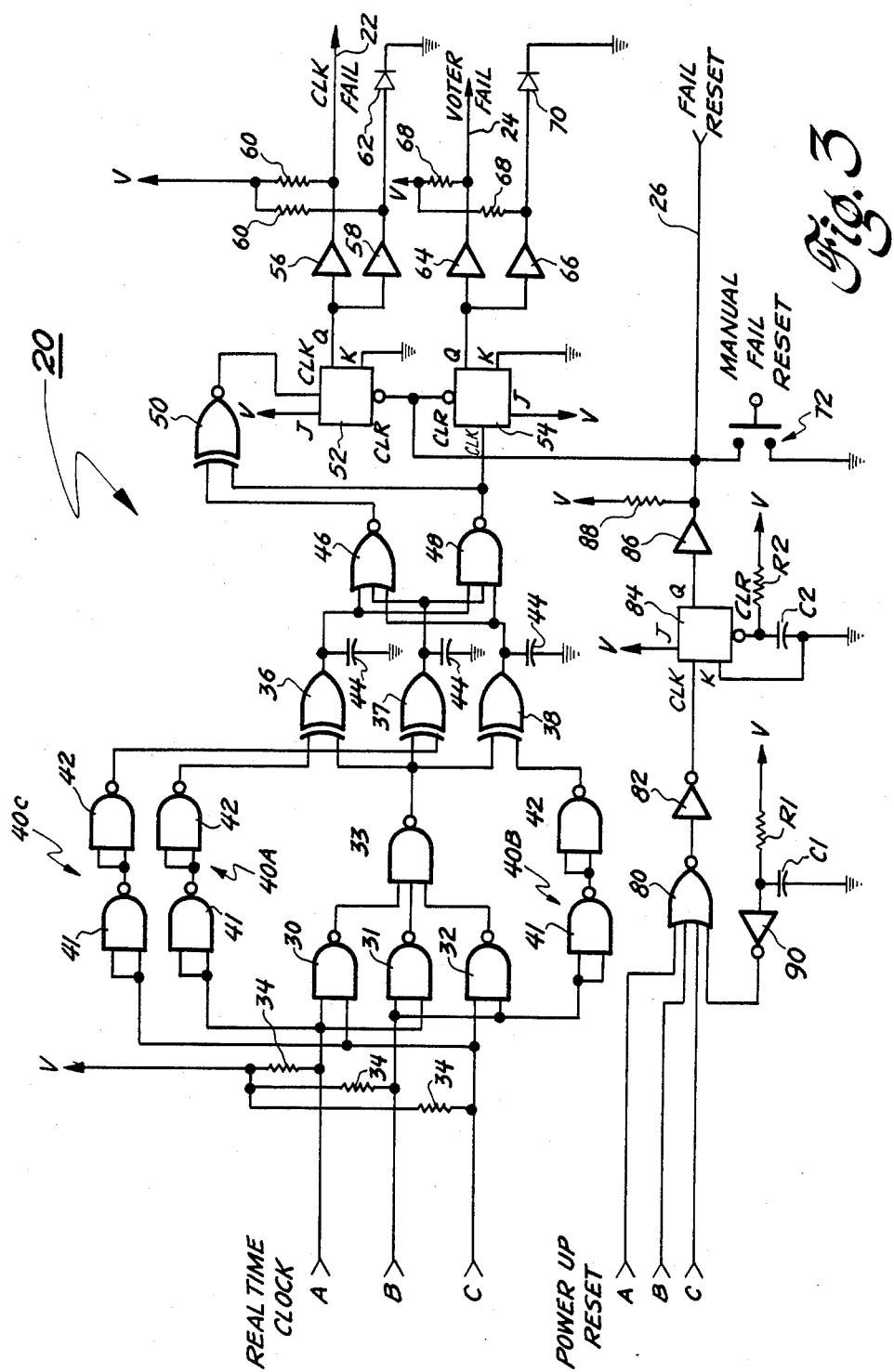
FIG. 3 is a schematic diagram of a fault detector in accordance with the invention.

FIG. 3 is a simplified schematic diagram of detector 20. As shown in FIG. 3, the real time clock signals A, B, and C, are supplied to a majority voter circuit comprising three two-input NAND gates 30, 31 and 32 and one three-input NAND gate 33 which receives the outputs from NAND gates 30–32. Each clock signal is supplied to two different NAND gates 30–32 and the input lines to these gates may be tied to a voltage source V through pull-up resistors 34 as shown. The logic output of the majority voter is AB + AC + BC, and this output (from NAND gate 33) may be applied in parallel to one input of each of three EXCLUSIVE OR gates 36, 37, and 38. Each of the EXCLUSIVE OR gates also receives, as a second input, one of the real time clock signals input to the detector after the clock signals have passed through corresponding delay equalization circuits 40A, 40B, and 40C which compensate for the time delay imposed on the clock signals by the majority voter circuit. As shown, each delay equalization circuit may comprise a pair of two-input NAND gates 41, 42 connected in series with each NAND gate being configured as an inverter.

The EXCLUSIVE OR gates 36–38 compare the clock signals with the output of the majority voter. If the clock signal and the majority voter output to an EXCLUSIVE OR gate agree, the output of the EXCLUSIVE OR gate is a logic zero. If, however, the clock signal disagrees with the majority voter output, which will be the case if its associated clock circuit has failed, the output of the EXCLUSIVE OR gate goes high, i.e. assumes a logic one state. If the majority voter fails, its output will differ from all three clock signals (assuming that none of the clock circuits has failed), and the outputs of all three EXCLUSIVE OR gates will go high. The EXCLUSIVE OR gates thus function as comparison devices which compare the clock signals with the voted majority clock signal and produce corresponding comparison signals indicative of the results of the comparison. By observing the pattern of the comparison signals, the type of failure (clock or majority voter) can be determined.

The output of each of the three EXCLUSIVE OR gates 36–38 may be connected through a capacitor 44 to ground, and connected in parallel to a three-input NOR gate 46 and a three-input NAND gate 48. The outputs of NOR gate 46 and NAND gate 48 may be input to an EXCLUSIVE NOR gate 50 which has its output connected to the clock input (CLK) of a J-K flip-flop 52. The J input of the flip-flop may be connected to the voltage source V, and the K input of the flip-flop may be grounded, as shown. The output of NAND gate 48 may also be connected to the clock input (CLK) of another J-K flip-flop 54, which also has its J input connected to the voltage source and its K input grounded. The clear inputs (CLR) of flip-flops 52 and 54 may be connected together and to a power-up timeout/reset circuit, to be described more fully shortly.

Flip-flop 52, which may be referred to as the clock flip-flop, has its Q output connected to a pair of parallel-connected buffer amplifers 56, 58, the outputs of which may be connected to the voltage source through pull-up resistors 60. The output of amplifier 56 is connected to the CLK FAIL line 22, and the output of amplifier 58 may be connected to a light emitting diode (LED) 62, as shown. As will be described shortly, upon a clock failure being detected, the Q output of flip-flop 52 is set, i.e., goes high, causing a CLK FAIL signal to be applied to line 22 and causing LED 62 to be illuminated. The LED provides a visual indication of the failure of a clock circuit, and the signal on line 22 may be used as an interrupt for a processor in processor system 18.

Similarly, the Q output of flip-flop 54 may be connected to a pair of parallel-connected buffer amplifiers 64 and 66, which have their outputs connected to the voltage source through pull-up resistors 68. The output of amplifier 64 may be connected to the VOTER FAIL line 24, and the output of amplifier 66 may be connected to another LED 70. Upon a failure of the majority voter being detected, the Q output of flip-flop goes high, causing a VOTER FAIL signal to be ouput on line 24 and causing LED 70 to be illuminated. As with the CLK FAIL signal, the VOTER FAIL signal may also be used as a processor system interrupt.

As previously noted, under fault-free conditions the outputs of EXCLUSIVE OR gates 36–38 are all low. Under these conditions, the outputs of NOR gate 46 and NAND gate 48 are both high, and the output of EXCLUSIVE NOR gate 50 is also high. Accordingly, flip-flops 52 and 54, which are clocked on a negative going high-low transition remain in a reset state and their Q outputs remain low.

In the event a clock circuit fails, the output of its corresponding EXCLUSIVE OR gate will assume a logic one state, i.e., go high, as previously noted. This causes the output of NOR gate 46 to change state from logic one to logic zero, but does not affect NAND gate 48, the output of which remains high. Since the inputs to EXCLUSIVE NOR gate 50 are now different, its output will go low causing flip-flop 52 to be clocked and setting the Q output of the flip-flop to produce a CLK FAIL signal and illuminate LED 62.

Conversely, if the majority voter fails, the outputs of EXCLUSIVE OR gates 36–38 will all go high and cause the outputs of both NOR gate 46 and NAND gate 48 to go low. This does not affect EXCLUSIVE NOR gate 50, since its inputs are both the same, and, accordingly, does not affect the state of flip-flop 52. However, the negative going transition of NAND gate 48 clocks flip-flop 54, causing its Q output to be set. This produces a VOTER FAIL output signal on line 24 and also illuminates LED 70.

In the event of a failure in both the majority voter and one or more of the clock circuits, both of the flip-flops will be clocked and both a CLK FAIL and a VOTER FAIL signal will be produced. As previously indicated, these signals may be employed as interrupts in processor system 18, and the processor system may be arranged to feedback a FAIL RESET signal to the detector via line 26. This reset signal, which corresponds to a logic zero level, is applied to the clear (CLR) inputs of the flip-flops, as shown, which resets the flip-flops. If the failure signal which was produced resulted from a transient occurrence, the flip-flops will remain reset when the reset signal is removed. However, if the failure resulted from a hard fault, the fault will exist when the reset signal is removed, and another failure signal will be produced. This feature is convenient for enabling verification of the nature of the failure. As shown in FIG. 3, the detector may also include a manual fail reset control 72 for manually resetting the flip-flops.

As noted earlier, it is desirable during a power-up situation to disable the detector to enable the clock system to stabilize. This may be accomplished by applying the power-up reset signals A, B, and C produced by the clock circuits to a four-input NOR gate 80, the output of which is connected to an inverting amplifier 82 which in turn is connected to the clock input of a J-K flip-flop 84. The Q output of the flip-flop may be connected to a buffer amplifier 86, which has its output connected to the voltage source V through a pull-up resistor 88, and to the clear inputs of flip-flops 52 and 54, as shown. The fourth input to NOR gate 80 may be derived from the output of an inverter amplifier 90 which has its input connected to the voltage source V through a resistor R1 and to ground through a capacitor C1. In a similar manner, the clear (CLR) input to flip-flop 84 may be connected to the voltage source through a resistor R2 and to ground through a capacitor C2.

The two RC networks R1-C1 and R2-C2 comprise timeout circuits. At the instant that the supply voltage V is turned on, the voltage across capacitor C2 is zero and the capacitor begins to charge to the supply voltage with a time constant determined by its value and the value of resistor R2. The low voltage across capacitor C2 applies a reset signal to the clear (CLR) input of flip-flop 84, which causes the Q output of the flip-flop to be low. This low output is coupled through amplifier 86 to the clear inputs of flip-flops 52 and 54 to reset these flip-flops.

Similarly, the voltage across capacitor C1 is initially zero when the supply voltage is turned on, which produces a high output level from inverter amplifier 90. Capacitor C1 begins to charge to the supply voltage with a time constant determined by the value of C1 and R1, and the output of inverter amplifier 90 remains high until the voltage across the capacitor reaches a predetermined value, at which time the output will go low. During the power-up timeout interval, the power-up reset signals A, B, and C are at a logic one level, and will remain at this level for a predetermined time corresponding to the power-up timeout interval. Since all of the inputs to NOR gate 80 are high during this interval, its output will be low and the output from inverter amplifier 82 to the clock input of flip-flop 84 will be high. Accordingly, the flip-flop will remain reset and maintain a reset signal to flip-flops 52 and 54 to hold these flip-flops in the reset state. This inhibits the operation of the detector by inhibiting the production of either of the failure signals in order to permit the clock system to stabilize. As long as any of the inputs to NOR gate 80 remain high, the Q output of flip-flop 84 will remain low and the reset signal will be maintained to flip-flops 52 and 54. The reset signal will also be maintained regardless of the inputs to NOR gate 80 as long as a reset signal is applied to the clear input of flip-flop 84, which is determined by the time constant R2-C2.

By selecting the values of R1 and C1 appropriately, the output of inverter amplifier 90 may be held at a logic one level for a desired period of time after the power-up reset signals have gone low. This enables the detector operation to be inhibited for an additional period of time to ensure that the clock circuits have achieved synchronization and are stabilized. This may be accomplished also by selecting the values of R2 and C2 to maintain flip-flop 84 reset. Upon the reset signal being removed from flip-flop 84 and the output of inverter amplifier 90 going low, the output of inverter amplifier 82 will go low and clock flip-flop 84. This causes the Q output of the flip-flop to go high, which will remove the reset signal from flip-flops 52 and 54, enabling operation of the detector.

As will be appreciated from the foregoing, the detector of the invention has the advantage of being simple in construction, yet highly advantageous in its ability to monitor, in real time, both itself and a plurality of outputs from a modular redundant system for faults, and to provide an output indication of both the type and the nature of a detected fault.

While a preferred embodiment of the invention has been shown and described, it will be appreciated by those skilled in the art that changes may be made in this embodiment without departing from the principles and spirit of the invention, the scope of which is defined in the appended claims. For example, the comparison signal processing portion of the detector comprising circuit elements 46–54 which receives the comparison signals from the EXCLUSIVE OR gates 36–38 and provides the failure signals may be replicated, if desired, to provide a redundant comparison signal processing circuit operating in parallel to insure production of the failure signals in the event of a fault in elements 46–54. Moreover, the detector may also include additional circuitry to indicate which of the three clock circuits has failed, if desired.

What we claim as new and desire to secure by Letters Patent of the United States is:

1. A self-checking fault detector for a modular redundant clock of the type that includes a plurality of clock circuits, each producing a clock signal, the detector comprising a majority voter circuit for receiving the clock signals and for producing a voted majority output signal; comparison means for comparing each of the clock signals with the voted majority output signal and for providing a plurality of corresponding comparison signals, one for each clock signal, representative of the results of the comparisons; and means responsive to the plurality of comparison signals for providing a first failure signal indicating a failure of a clock circuit and for providing a second failure signal indicating a failure of the majority voter circuit; wherein the comparison means comprises a plurality of comparison circuit elements, each receiving a different one of the clock signals and the voted majority output, and each providing a separate comparison signal representing the results of the comparison between its received clock signal and the voted majority output signal, said comparison signal having a first state when the clock signal and the voted majority output signal agree, and a second state when the clock signal and the voted majority output signal disagree; and wherein the failure signal providing means comprises a first circuit for providing the first failure signal upon any of the plurality of comparison signals being in the second state, and comprises a second circuit for providing the second failure signal only upon all of the comparison signals being in the second state.

2. The detector of claim 1, wherein the first circuit includes means connected to the second circuit and responsive to all of the comparison signals being in the second state for inhibiting production of the first failure signal.

3. The detector of claim 2, wherein the comparison circuit elements comprise EXCLUSIVE OR elements, and the first circuit and second circuits comprise, respectively, a NOR and a NAND element, each receiving said plurality of comparison signals.

4. The detector of claim 3, wherein the first and second circuits further comprise latch elements responsive to the outputs of said NOR and NAND elements for providing the first and second failure signals.

5. A self-checking fault detector for a modular redundant clock of the type that includes a plurality of real time clock circuits, each producing a voted real time clock signal, the detector comprising a majority voter circuit for receiving the clock signals and for producing a voted majority output signal; comparison means for comparing each of the clock signals with the voted majority output signal and for providing a plurality of corresponding comparison signals, one for each clock signal; said comparison means comprising a plurality of comparison circuit elements, each receiving a different one of the clock signals and the voted majority output, and each providing a separate comparison signal representing the results of the comparison between its received clock signal and the voted majority output signal; means responsive to the comparison signals for providing a first failure signal indicating a failure of one of said real time clock circuits and for providing a second failure signal indicating a failure of said majority voter circuit; and means for resetting the detector upon the production of either said first or second failure signal.

6. The fault detector of claim 5 further comprising means for supplying said first and second failure signals as interrupts to a processor system, and wherein said resetting means is comprised of means responsive to a reset signal fed back from the processor system for resetting said failure signal providing means.

7. The fault detector of claim 6 further comprising means for inhibiting the operation of said failure signal providing means and said fault detector for a predetermined period of time following power-up of the real time clock circuits.

* * * * *